3,154,576
SULFONATE EXTRACTION WITH DIMETHYL SULFOXIDE

Morton Z. Fainman, Los Angeles, Calif., assignor to Bray Oil Company, Los Angeles, Calif., a limited partnership of California
No Drawing. Filed Aug. 17, 1960, Ser. No. 50,079
4 Claims. (Cl. 260—504)

This invention relates to the manufacture of sulfonates and particularly the higher molecular weight sulfonates which are oil soluble. These products are commonly made by the treatment of lubricating oils with sulfur trioxide or fuming sulfuric acid commonly called oleum. In this process, the oil is intimately mixed with the acid, care being taken to keep the temperature below about 125° F. to avoid oxidation reactions. The sulfonation reaction is quite rapid and produces a mixture of products which are generally known as green acids and mahogany acids. The latter desirable acids remain dissolved in the unsulfonated oil whereas the green acids are found in a separate phase or sludge which settles out and is usually discarded. Various diluents may be used to assist in the separation of sludge, particularly aromatic solvents such as xylene, as shown in Bray U.S. Patent 2,732,344.

In the manufacture of sulfonates from lubricating oils, it is desirable to pre-treat the oil to remove polycyclic aromatics and the more reactive constituents which, if sulfonated, would simply increase the amount of sludge at the expense of increased acid consumption. This pretreatment is usually effected by extraction with selective solvents, by treatment with concentrated sulfuric acid, etc. Oils suitable for sulfonation usually contain about 15 to 20% of aromatic hydrocarbons reactible with oleum. In making mahogany sulfonates, it is desirable to employ oils having a molecular weight above 400 and usually in the range of 450 to 550 although, in some cases, residual oils can be employed in place of lubricating distillates. The amount of oleum required is ordinarily on the order of 10 to 20% by weight based on the oil treated.

After the sludge has been separated, it has usually been the practice to neutralize the so-called acid oil by treating with caustic soda. The resulting sodium sulfonates in solution in unsulfonated oil, now comprising about 15 to 20% by weight of the solution, are then concentrated by various methods in order to increase the sulfonate content. One method of concentration by selective treatment with aqueous solutions of butyl alcohol is described in the patent of Bray, U.S. 2,689,221. Other alcohols, such as ethyl and isopropyl, have also been used. After the sulfonates have been concentrated to a value in the range of about 30 to 40%, they are usually converted to polyvalent metal sulfonates, such as calcium or barium, by metathesis with the corresponding chloride of the desired metal, for example, calcium chloride. The converted calcium sulfonate is then washed to remove excess salts and finally dehydrated and filtered to produce the desired mahogany sulfonate, a viscous or semi-solid brown-red oil which finds numerous uses as an additive in the manufacture of lubricating oils where it performs the function of a detergent, rust preventive, etc.

Many attempts have been made heretofore to manufacture barium and calcium sulfonates and other polyvalent metal mahogany sulfonates by direct neutralization of the acid oil with calcium or barium hydroxide, etc. When this procedure is employed, however, it has been found very difficult and commercially impracticable to concentrate the resulting alkaline earth metal sulfonate owing to its high solubility in the unreacted lubricating oil. Many solvents have been tried for this purpose without success owing to their very poor distribution between sulfonate and oil.

I have now discovered a method by which polyvalent metal sulfonates and particularly the alkaline earth metal sulfonates can be readily and completely extracted from lubricating oil solutions in which they are produced. I have found that when the solution of sulfonate in oil is intimately contacted with substantially anhydrous dimethyl sulfoxide (DMSO), the sulfonate is almost completely removed in a single treatment. Where it is desired to completely remove the sulfonate from the oil, a second treatment may be given the oil or I may employ a countercurrent extraction to accomplish this result. The selective solvent action of dimethyl sulfoxide for alkaline earth metal sulfonates is so great that this solvent can be used as an analytical tool for analyzing these solutions which are otherwise very troublesome to analyze accurately.

By employing my new solvent technique for the concentration of alkaline earth metal sulfonates, and calcium sulfonate in particular, it is now possible to neutralize the sulfonated oils after removal of sludge, by directly contacting them with lime. I prefer to employ an excess of lime to insure complete neutralization. The excess can be filtered off and with it there will be removed substantially all the calcium sulfate which is formed simultaneously from the sulfuric acid associated with the sulfonic acids in the sulfonated oils. When operating in this way, it is desirable to dilute the sulfonated oil with a suitable solvent, for example, petroleum xylene, petroleum naphtha, or other hydrocarbon diluent. One volume of naphtha per volume of sulfonated oil is satisfactory, but the amount of naphtha may be greater or less, for example, from ½ to 2 volumes. In addition to facilitating sludge removal, the naphtha reduces the viscosity of the oil and aids neutralization with calcium hydroxide or barium hydroxide and separation by settling, centrifuging, or filtering the neutralized oil to remove the excess calcium hydroxide, barium hydroxide, etc.

Extraction with dimethyl sulfoxide can be applied to the calcium sulfonate, either in the presence of such hydrocarbon diluent just described or after the diluent has been removed by distillation. Where the sulfoxide treatment is applied to the diluted oil, it is desirable to employ a diluent having a boiling point substantially below that of dimethyl sulfoxide in order to facilitate recovery of the diluent for re-use in the process.

The amount of dimethyl sulfoxide required for the removal of alkaline earth metal sulfonates from lubricating oils varies with the character of the sulfonate and the oil, e.g., molecular weight, with the completeness of sulfonate removal desired and other factors; however, I have found that treatment of the oil with 0.05 to 0.5 volume of sulfoxide per volume of oil in one or two stages is sufficient for most purposes. After the extraction, it is necessary to recover the sulfoxide from both the oil fraction and the extract. This can be effected by distillation or by washing with water or an aqueous solution of an alcohol. Owing to the high stability of the sulfoxide, there is substantially no decomposition in the presence of water even at boiling temperatures. Accordingly, I may extract the sulfoxide from the sulfonate extract or the oil fraction by a secondary extraction with water in which the sulfoxide is extremely soluble. The sulfoxide is then recovered from the water solution by distillation.

It is generally preferred to recover the dimethyl sulfoxide by vacuum distillation owing to its relatively high boiling point at ordinary atmospheric pressure, i.e., 372° F.

The following examples will further illustrate my invention:

EXAMPLE 1

100 parts by volume of neutral calcium mahogany sulfonate having a concentration of about 40% in oil and molecular weight about 500 were dissolved in 100 parts (vol.) of naphtha (boiling point 175–225° F.). 100 parts (vol.) of dimethyl sulfoxide were added and thoroughly mixed by shaking. When settled, the two layers were separated and individually stripped in an inert atmosphere of carbon dioxide. The upper layer gave 55 parts (vol.) of a clear yellow petroleum oil. The lower layer gave 45 parts (vol.) of calcium sulfonate. This product had a sulfated ash of 10% (wt.) versus 5.9% for the starting calcium sulfonate in oil. This represents an increase in active calcium sulfonate concentration from 40% to 70% by weight.

EXAMPLE 2

100 parts by volume of neutral calcium sulfonate, as in Example 1, were thoroughly agitated with 100 parts of dimethyl sulfoxide and allowed to settle. 54 parts were withdrawn as the top layer and identified as a yellow lubricating oil fraction. The lower layer was mixed with 50 parts of naphtha (boiling point 175–225° F.) and 200 parts of water and allowed to stratify. The upper layer was removed and stripped in an inert atmosphere of carbon dioxide to a bottoms temperature of 400° F. The product represented 46 parts of calcium sulfonate with a sulfated ash of 9.2%. This represents an increase in active sulfonate concentration from 40% to 63%.

EXAMPLE 3

Acid oil having an acid number of 25, comprised of equal parts by volume of sulfonated 480 viscosity neutral oil and aromatic hydrocarbon solvent, was neutralized by thoroughly mixing with excess dry calcium hydroxide (hydrated lime). The excess lime and calcium sulfate produced in the reaction was filtered from the oil on a suction filter using diatomaceous earth filter aid. To 400 parts (vol.) of the clear red oil-solvent solution was added 50 parts of DMSO and the mixture allowed to separate into two phases. Separation was rapid, requiring only a few minutes.

The oil layer from the top was again extracted with 25 parts by volume of DMSO. Separation into two phases required more time than before. The dimethyl sulfoxide was recovered from the extract layer by distillation at about 20 mm. absolute pressure, leaving a viscous sulfonate containing about 50% of calcium sulfonate. The oil layer was filtered, giving a light yellow-red oil.

The sulfated ash values of the oil and extracts are a good measure of the completeness of sulfonate removal from the oil and concentration in the extract. The results follow:

| | Percent |
|---|---|
| Ash, oil phase | 0.030 |
| Ash, extract phase | 7.73 |

A test showed no detectable sulfate in the products and freedom from sodium and chlorine usually found in sulfonates prepared by caustic soda neutralization and conversion with calcium chloride.

EXAMPLE 4

100 parts by volume of acid oil containing an equal volume of aromatic solvent naphtha and sulfonated oil having a neutralization number of 26.1 was mixed with 100 parts of dimethyl sulfoxide. The mixture rapidly settled into two layers. The upper layer was essentially oil and aromatic solvent and had a neutralization number of 1.4. The lower layer was mahogany acid in dimethyl sulfoxide having a neutralization number of 25 on the solvent free basis, representing an extraction of 96% of the mahogany acid into the dimethyl sulfoxide layer.

EXAMPLE 5

*Analytical Method*

The separation of mahogany sulfonates from oils may be performed quantitatively by the following method:

Two grams of sample are thoroughly shaken with 20 ml. of dimethyl sulfoxide. The hazy solution is extracted with 20 ml. portions of petroleum ether until extraction is complete. The ether extracts are combined and extracted with 10 ml. of dimethyl sulfoxide. The ether is then removed in a vacuum oven at 200° F., and the residue is weighed and reported as the oil content.

The dimethyl sulfoxide extracts are then combined and diluted to 100 ml. with chloroform. A 5 ml. aliquot is used for titration with cetyl pyridinium bromide (Rapid Volumetric Method for Accurately Determining Certain Anionic Detergents with Cetyl Pyridinium Bromide, California Research Corporation, File 172,270 (400.20), January 12, 1950). From the weight of sulfonate thus obtained, the percent sulfonate content of the oil is calculated. This weight and the volume of cetyl pyridinium bromide (CPBr) reagent required is used to determine the equivalent weight. Likewise, the equivalent weight of the sulfonate is expressed as follows:

$$\text{Equivalent weight} = \frac{(\text{Wt. of sample} - \text{wt. of oil extract})}{\text{Mols CPBr}}$$

In addition to its use in the manufacture of sulfonates, my invention can be applied to the manufacture of acid refined lubricating oil, medicinal oil, technical white oils and the like. When such oils are refined from petroleum distillates or residua by treatment with concentrated or fuming sulfuric acid, some oil soluble sulfonation products tend to remain in the oil and interfere with its use. I have found that the extraction of such oils, either in the acid state directly after the acid treatment or after neutralization with caustic soda, lime, or other strong inorganic base or ammonia, effectively removes the oil soluble sulfonation products, leaving only traces of the order of 0.01 to 0.5% of sulfonates in the oil. Such small amounts of residual sulfonates can later be removed by treatment with adsorbent earth, fuller's earth, activated bentonite, alumina, silica gel, etc.

Having thus described my invention, what I claim is:

1. The method of removing alkaline earth metal sulfonates from a hydrocarbon oil solution which comprises forming a mixture of said solution resulting from sulfonation of an aromatic lubricating oil followed by neutralization with an alkaline earth metal base with dimethyl sulfoxide, separating the mixture into two phases, an oil phase low in sulfonate and a solvent phase containing a major part of the sulfonate content of the mixture and removing dimethyl sulfoxide from each of the said phases, thereby producing an oil substantially free of alkaline earth metal sulfonate and a concentrated solution of alkaline earth metal sulfonate in oil.

2. The method of claim 1 wherein the ratio of dimethyl sulfoxide to said hydrocarbon oil solution in said mixture is in the range of about 1–20 to 1–2.

3. The process of manufacturing alkaline earth metal sulfonates from lubricating oils which comprises sulfonating an aromatic type lubricating oil containing above about 15% aromatic hydrocarbons and having a molecular weight of at least 400, thereby producing an oil solution of preferentially oil soluble sulfonic acids contaminated with sulfuric acid, neutralizing said sulfonic and sulfuric acid by contacting with alkaline earth metal hydroxide, thereby forming alkaline earth metal sulfonates and sulfate in unsulfonated oil, contacting the neutralized oil with .01 to 0.5 part by volume of dimethyl sulfoxide, allowing the resulting mixture to separate into two phases, an oil phase and a solvent phase, and recovering a concentrated solution of said alkaline earth metal sulfonate from said solvent phase.

4. The process of claim 3 wherein said alkaline earth metal hydroxide is hydrated lime.

References Cited by the Examiner
UNITED STATES PATENTS

| | | | |
|---|---|---|---|
| 2,168,315 | 8/39 | Blumer | 260—504 |
| 2,365,898 | 12/44 | Morris et al. | 260—504 |
| 2,786,868 | 3/57 | Duncan et al. | 260—504 |
| 2,857,426 | 10/58 | Hutchins et al. | 260—504 |
| 2,940,994 | 6/60 | Gragson | 260—504 |

LEON ZITVER, *Primary Examiner.*